United States Patent
Ramola et al.

(10) Patent No.: US 12,205,303 B2
(45) Date of Patent: Jan. 21, 2025

(54) METHOD AND ELECTRONIC DEVICE FOR DETERMINING MOTION SALIENCY AND VIDEO PLAYBACK STYLE IN VIDEO

(71) Applicant: SAMSUNG ELECTRONICS CO., LTD., Suwon-si (KR)

(72) Inventors: Gaurav Ramola, Suwon-si (KR); Rishubh Parihar, Suwon-si (KR); Raviprasad Mohan Kini, Suwon-si (KR); Ranajit Saha, Suwon-si (KR); Sudha Velusamy, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 403 days.

(21) Appl. No.: 17/654,664

(22) Filed: Mar. 14, 2022

(65) Prior Publication Data
US 2022/0230331 A1    Jul. 21, 2022

Related U.S. Application Data

(63) Continuation of application No. PCT/KR2022/000897, filed on Jan. 18, 2022.

(30) Foreign Application Priority Data

Jan. 20, 2021 (IN) .............................. 202141002819
Dec. 8, 2021 (IN) .............................. 202141002819

(51) Int. Cl.
*G06T 7/246* (2017.01)
*G06N 20/00* (2019.01)
(Continued)

(52) U.S. Cl.
CPC .............. *G06T 7/246* (2017.01); *G06N 20/00* (2019.01); *G06V 20/46* (2022.01); *H04N 5/783* (2013.01); *G06T 2207/20081* (2013.01)

(58) Field of Classification Search
CPC .......... G06T 7/246; G06T 2207/20081; G06N 20/00; G06V 20/46; H04N 5/783
See application file for complete search history.

(56) References Cited

U.S. PATENT DOCUMENTS

| 2009/0087016 A1 | 4/2009 | Berestov et al. |
| 2016/0073011 A1 | 3/2016 | Fujita |
| (Continued) | | |

FOREIGN PATENT DOCUMENTS

| CN | 110472531 | 11/2019 |
| CN | 111757175 | 10/2020 |
| (Continued) | | |

OTHER PUBLICATIONS

Search Report and Written Opinion dated May 2, 2022 issued in International Patent Application No. PCT/KR2022/000897.

(Continued)

*Primary Examiner* — Quang N Vo
(74) *Attorney, Agent, or Firm* — Nixon & Vanderhye, P.C.

(57) ABSTRACT

Embodiments of the disclosure disclose a method for applying an effect in a video by an electronic device. The method includes: detecting a first object and a second object in an image frame of the video; determining a type of motion of the first object and the second object in video; determining a speed of the motion of the first object and the second object in the video; determining a first effect to be applied to the first object and a second effect to be applied to the second object based on the type of motion of the first object and the second object and the speed of the motion of the first object and the second object; and applying the first effect to the first object and the second effect to the second object.

15 Claims, 10 Drawing Sheets

(51) Int. Cl.
*G06V 20/40* (2022.01)
*H04N 5/783* (2006.01)

(56) References Cited

U.S. PATENT DOCUMENTS

| | | | |
|---|---|---|---|
| 2018/0107881 A1 | 4/2018 | Datta et al. | |
| 2018/0268867 A1* | 9/2018 | Matsumoto | G11B 27/28 |
| 2020/0099868 A1 | 3/2020 | Barthwal et al. | |
| 2020/0349975 A1 | 11/2020 | Krishnamurthy et al. | |
| 2021/0056709 A1* | 2/2021 | Bagherinezhad | G06T 7/20 |
| 2021/0326597 A1 | 10/2021 | Yi et al. | |
| 2022/0101654 A1 | 3/2022 | Zhang et al. | |

FOREIGN PATENT DOCUMENTS

| | | | | |
|---|---|---|---|---|
| CN | 116349233 A * | 6/2023 | | G06N 20/00 |
| KR | 10-2007-0027381 | 3/2007 | | |
| KR | 10-1894956 | 10/2018 | | |
| KR | 10-2020-0067682 | 11/2020 | | |
| WO | 2020/156245 | 8/2020 | | |

OTHER PUBLICATIONS

Office Action dated Jan. 9, 2022 issued in Indian Application No. 202141002819 with English translation (7 pages).
Lin et al., "Temporal shift module for efficient video understanding", (English Family No. https://arxiv.org/abs/1811.08383), 2019, 13 pages.
Benaim et al., "SpeedNet: Learning the Speediness in Videos", (English Family No. https://arxiv.org/abs/2004.06130), 2020, 10 pages.
Ding et al., "Video Saliency Detection by 3D Convolutional Neural Networks", (English Family No. https://arxiv.org/abs/1807.04514), 2017, 10 pages.
Extended European Search Report dated Nov. 3, 2023 issued in European Patent Application No. 22742795.2.

* cited by examiner

METHOD AND ELECTRONIC DEVICE FOR DETERMINING MOTION SALIENCY AND VIDEO PLAYBACK STYLE IN VIDEO

CROSS-REFERENCE TO RELATED APPLICATIONS

This application is a continuation of International Application No. PCT/KR2022/000897 designating the United States, filed on Jan. 18, 2022, in the Korean Intellectual Property Receiving Office and claiming priority to Indian Provisional Patent Application No. 202141002819, filed on Jan. 20, 2021, in the Indian Patent Office, and to Indian Patent Application No. 202141002819, filed on Dec. 8, 2021, in the Indian Patent Office, the disclosures of all of which are incorporated by reference herein in their entireties.

BACKGROUND

Field

The disclosure relates to a content analyzing system, and is, for example, related to a method and an electronic device for determining motion saliency and video playback style in a video.

Description of Related Art

An electronic device includes an intelligent camera system which automatically handles user requirements using a video data. The video data may include a frame visual detail, across frame temporal information (e.g., motion), and audio stream information. Further, motion information (across frame temporal information) is unique for the videos and carries rich information about actions in the video. Further, learning the important motion information in the videos will help a network to learn strong spatio-temporal features which can be used on multitude of video analysis tasks and understanding its patterns can help in better video composition styles that can increase the overall video aesthetics. But, in the conventional methods, there is no method available on classifying different playback style in videos. Further, there is no competitor or third party solution for an automatic intelligent video analysis. Furthermore, all available video editing methods need the human to edit and generate the interesting clips out of a video by manually selecting video playback type and speed.

Thus, it is desired to address the above mentioned disadvantages or other shortcomings or at least provide a useful alternative.

SUMMARY

Embodiments of the disclosure provide a method and an electronic device for determining motion saliency and video playback style in a video.

Embodiments of the disclosure determine one or more motion pattern associated with a video, so as to assist in generating automated video composition styles.

Embodiments of the disclosure predict saliency detection associated with the video, a video playback style, a video playback type and video playback speed in a real time.

Embodiments of the disclosure analyse, understand, and classify the temporal motion patterns (e.g., linear, projectile) and spatial motion regions (e.g., waving flag or the like) into meaningful classes for multiple applications such as Artificial intelligence (AI) playback style prediction, AI cinemographs, and dynamic adaptive video generation.

Embodiments of the disclosure determine motion directions like linear, loop, trajectories, random, etc., of the subject/objects in a scene of the video and use the semantic information to select suitable play back style for the video.

Embodiments of the disclosure determine the motion directions like fast, slow, normal, of the subject/object in the scene and uses the semantic information to select suitable play back style for the video.

Embodiments of the disclosure locate the spatial region of the video that has stronger and patterned motion present in the video.

According to various example embodiments of the disclosure a method for determining motion saliency and video playback style in a video by an electronic device is provided. The method includes: detecting, by the electronic device, a first object and a second object in at least on image frame of the video; determining, by the electronic device, a type of motion of the first object and the second object in the video; determining, by the electronic device, a speed of the motion of the first object and the second object in the video; determining, by the electronic device, a first effect to be applied to the first object and a second effect to be applied to the second object based on the type of motion of the first object and the second object and the speed of the motion of the first object and the second object; and applying, by the electronic device, the first effect to the first object and the second effect to the second object.

According to an example embodiment, determining, by the electronic device, the first effect to be applied to the first object and the second effect to be applied on the second object includes: classifying, by the electronic device, the motion of the first object and the second object into a at least one specified category by applying at least one motion-based machine learning model on the type of motion of the first object and the second object and the speed of the motion of the first object and the second object; and predicting, by the electronic device, the first effect to be applied to the first object and the second effect to be applied on the second object based on at least one category of the motion of the first object and the second object.

According to an example embodiment, the method includes: training, by the electronic device, the at least one motion-based training model to predict the first effect and the second effect, wherein training the at least one motion-based training model includes: determining a plurality of motion cues in the video; determining a plurality of motion factors in the video; and training the at least one motion-based training model based on the plurality of motion cues and the plurality of motion factors to predict the first effect to be applied on the first object and the second effect to be applied on the second object.

According to an example embodiment, the motion cues comprise: temporal motion features, spatial motion features and spatio-temporal knowledge of the video.

According to an example embodiment, the motion factors comprise: a direction of the motion of each object in the video; a pattern of the motion of each object in the video, an energy level of the motion in the video; and a saliency map of the motion in the video.

According to an example embodiment, applying, by the electronic device, the first effect to the first object and the second effect to the second object includes: determining, by the electronic device, a size of the first object and a duration of the first object being in the motion in the at least one image frame of the video; determining, by the electronic device, a size of the second object and a duration of the second object being in the motion in the at least one image frame of the video; determining, by the electronic device, a time period when both the first object and the second object are simultaneously in motion in the at least one image frame of the video based on the size of the first object, the duration of the first object, the size of the second object and the duration of the second object; and applying, by the electronic device, the first effect to the first object and the second effect during the determined time period.

According to an example embodiment, determining, by the electronic device, the type of motion of the first object and the second object in the video includes: determining, by the electronic device, the type of motion of the first object at a first time interval; and determining, by the electronic device, the type of motion of the second object at a second time interval, wherein the first time interval is different than the second time interval.

According to an example embodiment, determining, by the electronic device, the speed of the motion of the first object and the second object in the video includes: determining, by the electronic device, the speed of the motion of the first object at a first time interval; and determining, by the electronic device, the speed of the motion of the second object at a second time interval, wherein the first time interval is different than the second time interval.

According to an example embodiment, the first effect comprises at least one of a first style effect and a first frame rate speed effect; and wherein the second effect comprises at least one of a second style effect and a second frame rate speed effect.

Accordingly, various example embodiments of the disclosure disclose an electronic device configured to determine motion saliency and video playback style in a video. The electronic device includes: a memory storing the video, a processor; and a video motion controller communicatively coupled to the memory and the processor, and a video playback controller communicatively coupled to the memory and the processor. The video motion controller is configured to: detect a first object and a second object in at least on image frame of the video and determine a type of motion of the first object and the second object in the video; determine a speed of the motion of the first object and the second object in the video; determine a first effect to be applied to the first object and a second effect to be applied on the second object based on the type of motion of the first object and the second object and the speed of the motion of the first object and the second object; and apply the first effect to the first object and the second effect to the second object.

These and other aspects of the various example embodiments of the disclosure will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The embodiments are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

Figure 1:
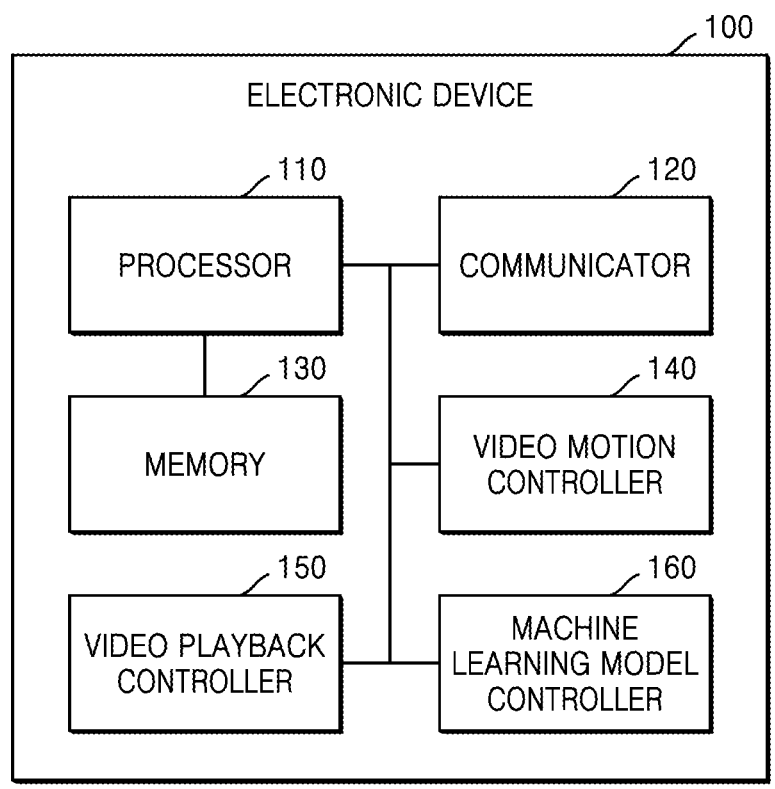
FIG. 1 is a block diagram illustrating an example configuration of an electronic device for determining motion saliency and video playback style in a video, according to various embodiments.

Various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the disclosure with unnecessary detail. The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like.

The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to aid in understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for determining motion saliency and video playback style in a video by an electronic device. The method includes detecting, by the electronic device, a first object and a second object in at least on image frame of the video. Further, the method includes determining, by the electronic device, a type of motion of the first object and the second object in the video. Further, the method includes determining, by the electronic device, a speed of the motion of the first object and the second object in the video. Further, the method includes determining, by the electronic device, a first effect to be applied to the first object and a second effect to be applied on the second object based on the type of motion of the first object and the second object and the speed of the motion of the first object and the second object. Further, the method includes applying, by the electronic device, the first effect to the first object and the second effect to the second object.

Unlike conventional methods and systems, the disclosed method can be used to determine one or more motion pattern associated with the video, so as to assist in generating automated video composition styles. The method can be used to predict saliency detection associated with the video, a video playback style, a video playback type and video playback speed in a real time. in the proposed method, the video feature extractor can be a light-weight convolutional neural network (CNN) based on mobilenetv2 and extracts important spatio-temporal features from the video segments so as to analyse multiple real-time videos in the electronic device in an effective manner.

The method can be used to analyse, understand, and classify the temporal motion patterns (e.g., linear, projectile) and spatial motion regions (e.g., waving flag or the like) into meaningful classes for multiple applications such as Artificial intelligence (AI) playback style prediction, AI cinemographs, and dynamic adaptive video generation. The method can be used to determine motion directions like linear, loop, trajectories, random, etc., of the subject/object in a scene of the video and use the semantic information to select suitable play back style for the video. The method can be used to determine the motion directions like Fast, Slow, Normal, of the subject/object in the scene and use the semantic information to select suitable play back style for the video. The method can be used to locate the spatial region of the video that has stronger and patterned motion present in the video.

The user of the electronic device may point the imaging device (e.g., camera or the like) towards the scene to capture one or more event and the automatic short video/s/cinematograph will be created based on the frames captured by the camera in a single-take camera mode and analysis of them to classify the motions in a real time.

The method can be used to play the video in appropriate style (e.g. Boomerang, Slo-Mo, Hyper-lapse, GIF playing in a loop, playing the video in reverse) based on the result of the analysis. The method can be used to generate a cinematograph/AliveSelfie/stories creation/dynamic video from the detected saliency information. Based on the example method, the electronic device can retrieve similar videos from the gallery based on patterns of motion happening in the videos.

The network is light-weight in design to suit the electronic device deployment and able to extract better video feature descriptors learning unique motion patterns. The electronic device is trained to extract important features about the motion present in the video including dominant motion direction, motion pattern, motion energy, motion saliency. The method focuses on the extraction of only the useful simple features from the video which contributes to the applications (e.g., camera applications, gallery application or the like). The method requires much less data to train on for extracting better video feature descriptors learning unique motion patterns. The proposed method can be can be used for generating time-varying, adaptive video speedups, which can allow viewers to watch videos faster, but with less of the jittery, unnatural motions typical to videos that are sped up uniformly.

In the various example methods, the electronic device (e.g., compact and low-weight mobile videography system or the like) can analyse, understand, and classify the temporal motion patterns (e.g., Linear, Projectile, etc) and spatial motion regions (e.g., waving flag) into meaningful classes for multiple applications such as AI playback style prediction, AI cinemographs, dynamic adaptive video generation, etc. In an example, for a single-take photo application, AI understanding of the video to create meaningful dynamic video, highlight video, etc.

Referring now to the drawings, and more particularly to FIGS. 1 through 10, there are illustrated and described various example embodiments of the disclosure.

FIG. 1 is a block diagram illustrating an example configuration of an electronic device (100) for determining motion saliency and video playback style in a video, according to various embodiments. The electronic device (100) may include, for example, but not limited to a foldable device, a cellular phone, a smart phone, a Personal Digital Assistant (PDA), a tablet computer, a laptop computer, a smart watch, an immersive device, a virtual reality device, a compact and low-weight mobile videography system, a camera, and an Internet of Things (IoT) or the like.

In an embodiment, the electronic device (100) includes a processor (e.g., including processing circuitry) (110), a communicator (e.g., including communication circuitry) (120), a memory (130), a video motion controller (e.g., including control circuitry) (140), a video playback controller (e.g., including control circuitry) (150) and a machine learning model controller (e.g., including control circuitry) (160). The processor (110) is coupled with the communicator (120), the memory (130), the video motion controller (140), the video playback controller (150) and the machine learning model controller (160). The video playback controller (150) and/or a machine learning model controller (160) can be implemented as a hardware processor by combining the processor (110), the video playback controller (150) and the machine learning model controller 160.

The video motion controller (140) may include various control circuitry and is configured to detect a first object and a second object in an image frame of the video. The video motion controller (140) is configured to determine a type of motion of the first object at a first time interval and a type of motion of the second object at a second time interval. The first time interval is different than the second time interval.

The video motion controller (140) is configured to determine a speed of the motion of the first object at a first time interval and determine the speed of the motion of the second object at a second time interval, where the first time interval is different than the second time interval.

A video playback controller (150) may include various control circuitry and is configured to classify the motion of the first object and the second object into a predefined (e.g., specified) category by applying a motion-based machine learning model on the type of motion of the first object and the second object and the speed of the motion of the first object and the second object using the machine learning model controller (160). The video playback controller (150) is configured to predict the first effect to be applied to the first object and the second effect to be applied on the second object based on the category of the motion of the first object and the second object. The first effect can include, for example, but not limited a first style effect and a first frame rate speed effect. The second effect may include, for example, but not limited a second style effect and a second frame rate speed effect.

The video playback controller (150) is configured to train the motion-based training model to predict the first effect and the second effect. The motion-based training model is trained by determining a plurality of motion cues in the video, determining a plurality of motion factors in the video, and training the motion-based training model based on the plurality of motion cues and the plurality of motion factors to predict the first effect to be applied on the first object and the second effect to be applied on the second object.

The plurality of motion cues may include, for example, but not limited to temporal motion features, spatial motion features and spatio-temporal knowledge of the video. The plurality of motion factors may include, for example, but not limited to a direction of the motion of each object in the video, a pattern (e.g., spatially local, global, repeat) of the motion of each object in the video, an energy level of the motion in the video, and a saliency map of the motion in the video. Among the patterns of the motion of each object in the video, spatially local may indicate the motion occurring locally—within a predetermined boundary in a scene of the video, spatially global may indicate the motion occurring globally—beyond a predetermined boundary in a scene of the video, and the repeat of the motion may indicate the same or substantially same motion occurring within a predetermined time period. The motion cues and the plurality of motion factors identified by the electronic device (100) can be used to identify the motion segments in the video. For the portions of the videos having high amount of motion will have stronger motion factors and cues.

The electronic device (100) can learn the motion representations of the videos, thus, the extracted features of one video can be compared with that of other videos to find the similar videos from various applications (e.g., gallery application or the like). Further, the electronic device (100) may also initialise the model for action recognition task with the learned weights from motion feature extraction task and then fine tune the model for the action recognition task. This eradicates and/or reduces the need to pre-train the action recognition task with a large action recognition dataset.

The video playback controller (150) is configured to determine a size of the first object and duration of the first object being in the motion in the image frame of the video. The video playback controller (150) is configured to determine a size of the second object and duration of the second object being in the motion in the image frame of the video. The video playback controller (150) is configured to determine a time period when both the first object and the second object are simultaneously in motion in the image frame of the video based on the size of the first object, the duration of the first object, the size of the second object and the duration of the second object.

The video playback controller (150) is configured to apply the first effect to the first object and the second effect during the determined time period. In an example, when two objects are in motion simultaneously in the video, the electronic device (100) may apply the effect based on the object's size and the presence of the object in the duration of the video. In an example, someone is cycling and a thrown football comes into the preview scene, based on the proposed method, the method can be used to apply effect based on the cycle event detected.

The processor (110) may include various processing circuitry and is configured to execute instructions stored in the memory (130) and to perform various processes. The communicator (120) may include various communication circuitry and is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may include, for example, and without limitation, a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Being provided through learning may refer, for example, to a predefined operating rule or AI model of a desired characteristic being made by applying a learning algorithm to a plurality of learning data. The learning may be performed in a device itself in which AI according to an embodiment is performed, and/o may be implemented through a separate server/system.

The AI model may comprise of a plurality of neural network layers. Each layer may have a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may refer to a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1 shows various hardware components of the electronic device (100) it is to be understood that various embodiments are not limited thereon. In other embodiments, the electronic device (100) may include less or more number of components. Further, the labels or names of the components are used only for illustrative purpose and does not limit the scope of the disclosure. One or more components can be combined together to perform same or substantially similar function in the electronic device (100).

Figure 2:
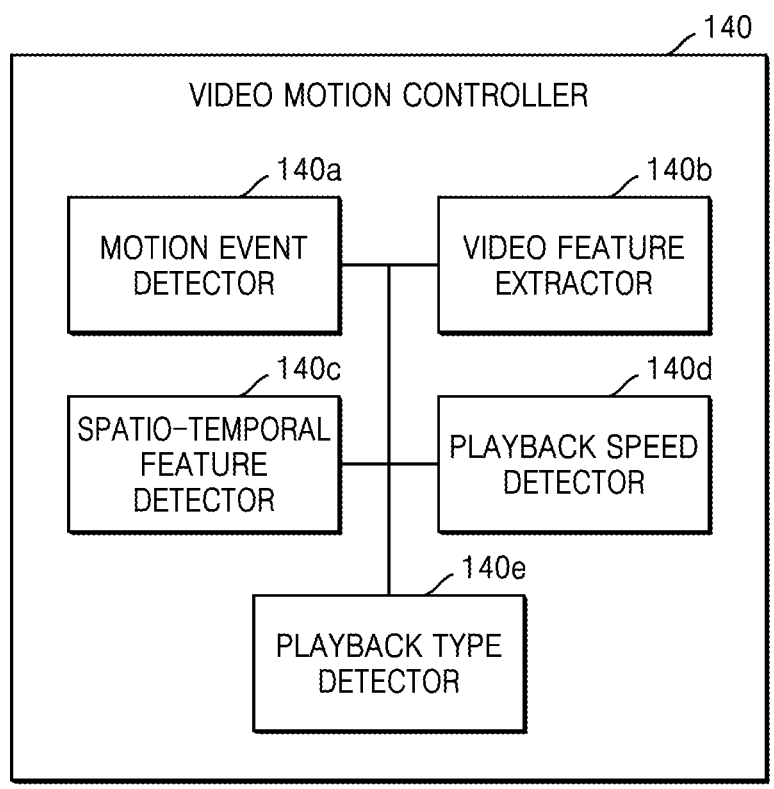
FIG. 2 is a block diagram illustrating an example configuration of a video motion controller included in the electronic device, according to various embodiments.

FIG. 2 is a block diagram illustrating an example configuration of the video motion controller (140) included in the electronic device (100), according to various embodiments. In an embodiment, the video motion controller (140) includes a motion event detector (e.g., including various processing circuitry and/or executable program instructions) (140a), a video feature extractor (e.g., including various processing circuitry and/or executable program instructions) (140b), a spatio-temporal feature detector (e.g., including various processing circuitry and/or executable program instructions) (140c), a playback speed detector (e.g., including various processing circuitry and/or executable program instructions) (140d), and a playback type detector (e.g., including various processing circuitry and/or executable program instructions) (140e).

The motion event detector (140a) receives the input video stream and detects the motion in the input video stream. The video feature extractor (140b) can be a light-weight CNN based on mobilenetv2 and extracts important spatio-temporal features from the motion detected input video stream. The playback speed detector (140d) predicts the video playback speed on the motion detected input video stream and the playback type detector (140e) predicts the video playback type on the motion detected input video stream. The spatio-temporal feature detector (140c) maps to predict the video playback speed and playback type on the motion detected input video stream.

Although the FIG. 2 shows various hardware components of the video motion controller (140) it is to be understood that other embodiments are not limited thereon. In other embodiments, the video motion controller (140) may include less or more number of components. Further, the labels or names of the components are used only for illustrative purpose and does not limit the scope of the disclosure. One or more components can be combined together to perform same or substantially similar function in the video motion controller (140).

Figure 3:
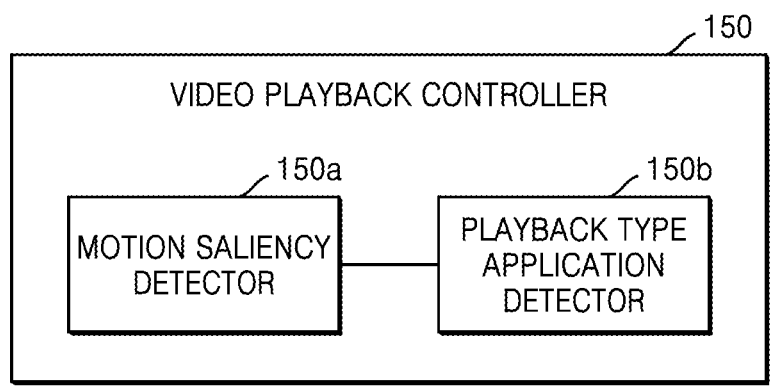
FIG. 3 is a block diagram illustrating various hardware components of a video playback controller included in the electronic device, according to various embodiments.

FIG. 3 is a block diagram illustrating various components of the video playback controller (150) included in the electronic device (100), according to various embodiments. In an embodiment, the video playback controller (150) includes a motion saliency detector (e.g., including various processing circuitry and/or executable program instructions) (150a) and a playback type application detector (e.g., including various processing circuitry and/or executable program instructions) (150b). The motion saliency detector (150a) locates the spatial region of the video that has stronger and patterned motion present in the video (assuming background is nearly static). The motion saliency detector (150a) locates foreground or background motion regions in the video. The playback type application detector (150b) detects the playback type application.

Although the FIG. 3 shows various hardware components of the video playback controller (150) it is to be understood that other embodiments are not limited thereon. In other embodiments, the video playback controller (150) may include less or more number of components. Further, the labels or names of the components are used only for illustrative purpose and does not limit the scope of the disclosure. One or more components can be combined together to perform same or substantially similar function in the video playback controller (150).

Figure 4:
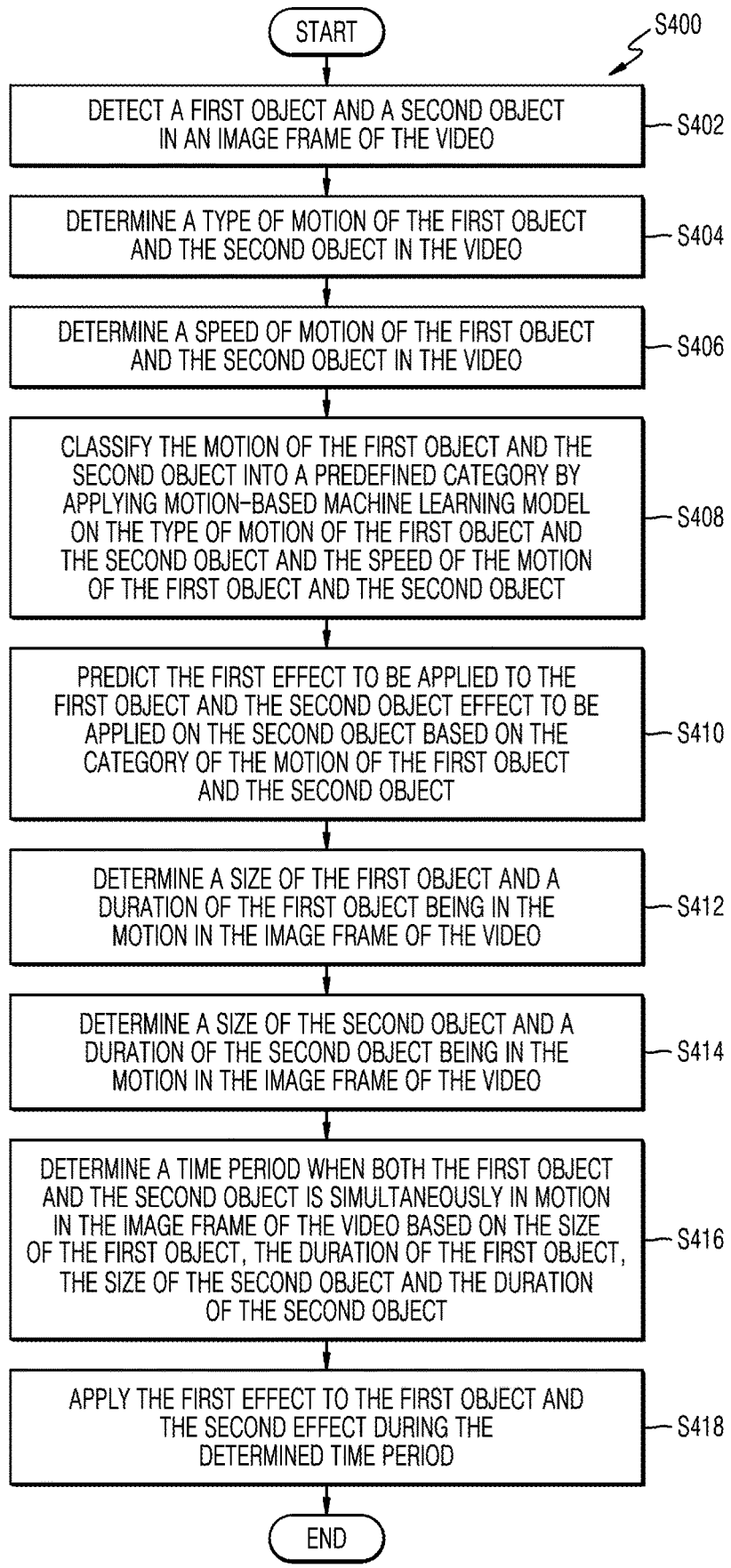
FIG. 4 is a flowchart illustrating an example method for determining motion saliency and video playback style in the video, according to various embodiments.

FIG. 4 is a flowchart (400) illustrating an example method for determining the motion saliency and the video playback style in the video, according to various embodiments.

The operations (S402-S406) may be performed by the video motion controller (140). At S402, the method includes detecting the first object and the second object in the image frame of the video. At S404, the method includes determining the type of motion of the first object and the second object in the video. At S406, the method includes determining the speed of the motion of the first object and the second object in the video.

The operations (S408-S418) may be performed by the video playback controller (150). At S408, the method includes classifying the motion of the first object and the second object into the predefined (e.g., specified) category by applying the motion-based machine learning model on the type of motion of the first object and the second object and the speed of the motion of the first object and the second object.

At S410, the method includes predicting the first effect to be applied to the first object and the second effect to be applied on the second object based on the category of the motion of the first object and the second object. At S412, the method includes determining the size of the first object and the duration of the first object being in the motion in the image frame of the video. At S414, the method includes determining the size of the second object and the duration of the second object being in the motion in the image frame of the video.

At S416, the method includes determining the time period when both the first object and the second object are simultaneously in motion in the image frame of the video based on the size of the first object, the duration of the first object, the size of the second object and the duration of the second object. At S418, the method includes applying the first effect to the first object and the second effect during the determined time period.

Unlike conventional methods and systems, the disclosed method can be used to determine one or more motion pattern associated with the video, to assist in generating automated video composition styles. The method can be used to predict saliency detection associated with the video, a video playback style, a video playback type and video playback speed in a real time. in the proposed method, the video feature extractor can be a light-weight CNN based on mobilenetv2 and extracts important spatio-temporal features from the video segments so as to analysis multiple real-time videos in the electronic device in an effective manner.

The method can be used to analyse, understand, and classify the temporal motion patterns (e.g., linear, projectile) and spatial motion regions (e.g., waving flag or the like) into meaningful classes for multiple applications such as Artificial intelligence (AI) playback style prediction, AI cinemographs, and dynamic adaptive video generation. The method can be used to determine motion directions like linear, loop, trajectories, random, etc., of the subject/object in a scene of the video and use the semantic information to select suitable play back style for the video. The method can be used to determine the motion directions like Fast, Slow, Normal, of the subject/object in the scene and use the semantic information to select suitable play back style for the video. The method can be used to locate the spatial region of the video that has stronger and patterned motion present in the video.

The user of the electronic device (100) may point the imaging device (e.g., camera or the like) towards the scene to capture one or more event and the automatic short video/s/cinematograph will be created based on the frames captured by the camera in a single-take camera mode and analysis of them to classify the motions in a real time.

The method can be used to play the video in appropriate style (e.g. Boomerang, Slo-Mo, Hyper-lapse, GIF playing in a loop, playing the video in reverse) based on the result of the analysis. The method can be used to generate a cinematograph/AliveSelfie/stories creation/dynamic video from the detected saliency information. Based on the proposed method, the electronic device can retrieve similar videos from the gallery based on patterns of motion happening in the videos.

The network is light-weight in design to suit the electronic device deployment and able to extract better video feature descriptors learning unique motion patterns. The electronic device is trained to extract important features about the motion present in the video including dominant motion direction, motion pattern, motion energy, motion saliency. The method focuses on the extraction of only the useful simple features from the video which contributes to the applications (e.g., camera applications, gallery application or the like). The method requires very less data to train on for extracting better video feature descriptors learning unique motion patterns.

In the disclosed method, the electronic device (100) can analyse, understand, and classify the temporal motion patterns (e.g., Linear, Projectile, etc) and spatial motion regions (e.g., waving flag) into meaningful classes for multiple applications such as AI playback style prediction, AI cinemographs, dynamic adaptive video generation, etc. In an example, for a single-take photo application, AI understanding of the video to create meaningful dynamic video, highlight video, etc. The proposed method can be can be used for generating time-varying, adaptive video speedups, which can allow viewers to watch videos faster, but with less of the jittery, unnatural motions typical to videos that are sped up uniformly.

The various actions, acts, blocks, steps, or the like in the flow diagram (400) may be performed in the order presented, in a different order or simultaneously. In various embodiments, some of the actions, acts, blocks, steps, or the like may be omitted, added, modified, skipped, or the like without departing from the scope of the disclosure.

Figure 5:
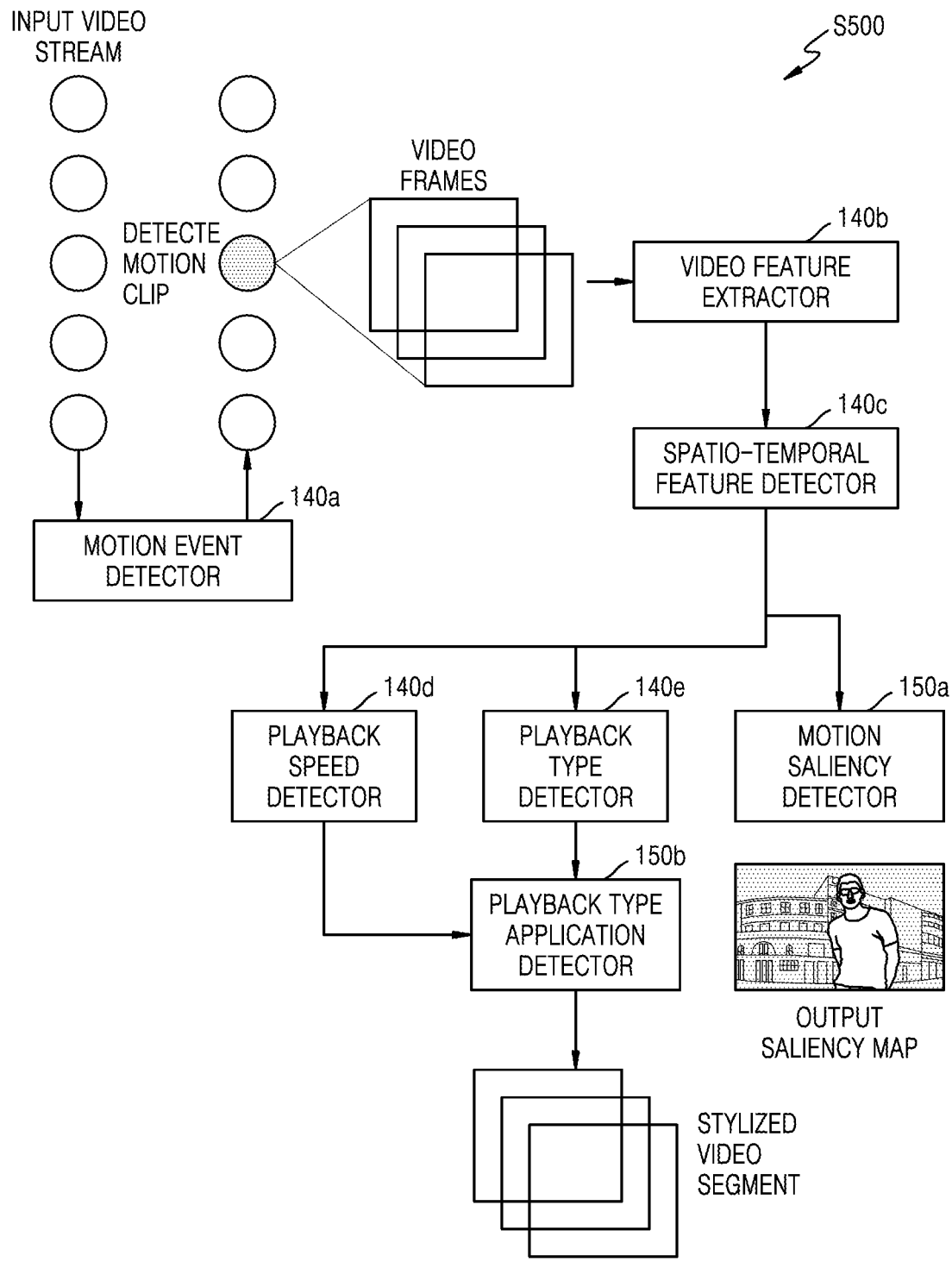
FIG. 5 is a diagram illustrating an example in which the electronic device determines the motion saliency and the video playback style in the video, according to various embodiments.

FIG. 5 is a diagram illustrating an example (S500) in which the electronic device (100) determines the motion saliency and the playback style in the video, according to various embodiments.

In an example, the motion event detector (140a) receives the input video stream and detects the motion in the input video stream. The video feature extractor (140b) can be a light-weight CNN based on mobilenetv2 and extracts important spatio-temporal features from the motion detected input video stream. The playback speed detector (140d) predicts the video playback speed on the motion detected input video stream and the playback type detector (140e) predicts the video playback type on the motion detected input video stream. The spatio-temporal feature detector (140c) maps to predict the video playback speed and playback type on the motion detected input video stream. Further, the motion saliency detector (150a) locates the spatial region of the video that has stronger and patterned motion present in the video. The motion saliency detector (150a) locates the foreground or background motion regions in the video. The playback type application detector (150b) detects the playback type application.

Figure 6:
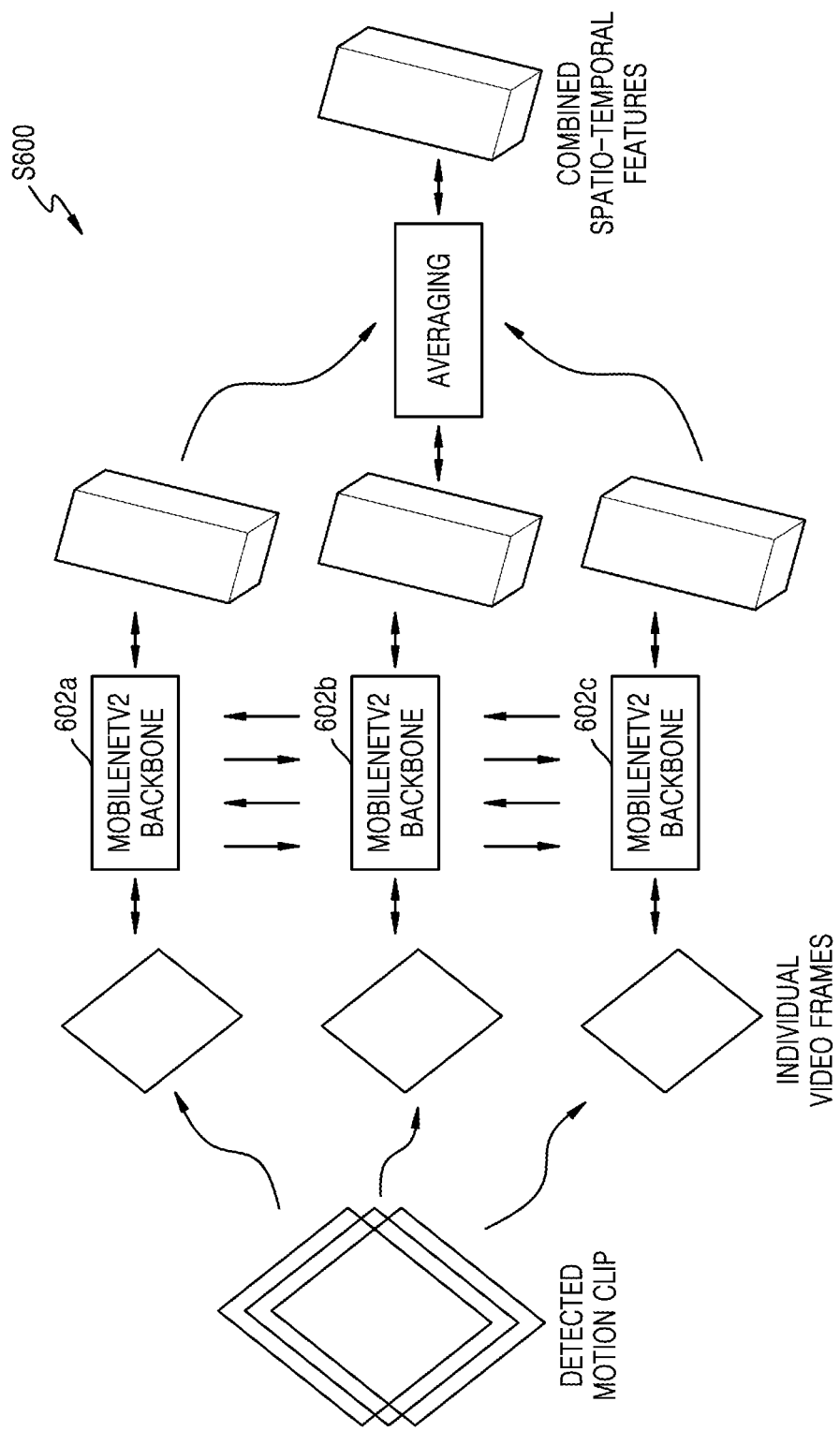
FIG. 6 is a diagram illustrating example operations of the video feature extractor are explained, according to various embodiments.

FIG. 6 is a diagram (S600) illustrating an example in which the operations of the video feature extractor are explained, according to various embodiments. The method can be used to detect the motion in the input video stream. Further, the method allows the video feature extractor (140b) (e.g., light-weight CNN based on mobilenetv2) extracts important spatio-temporal features from the motion detected input video stream. Further, the proposed method also uses a Temporal Segment Module (TSM) network with mobilenetv2 backbone because of its efficiency. The proposed method performs the multi-task training process which results in learning useful spatio-temporal features.

Figure 7:
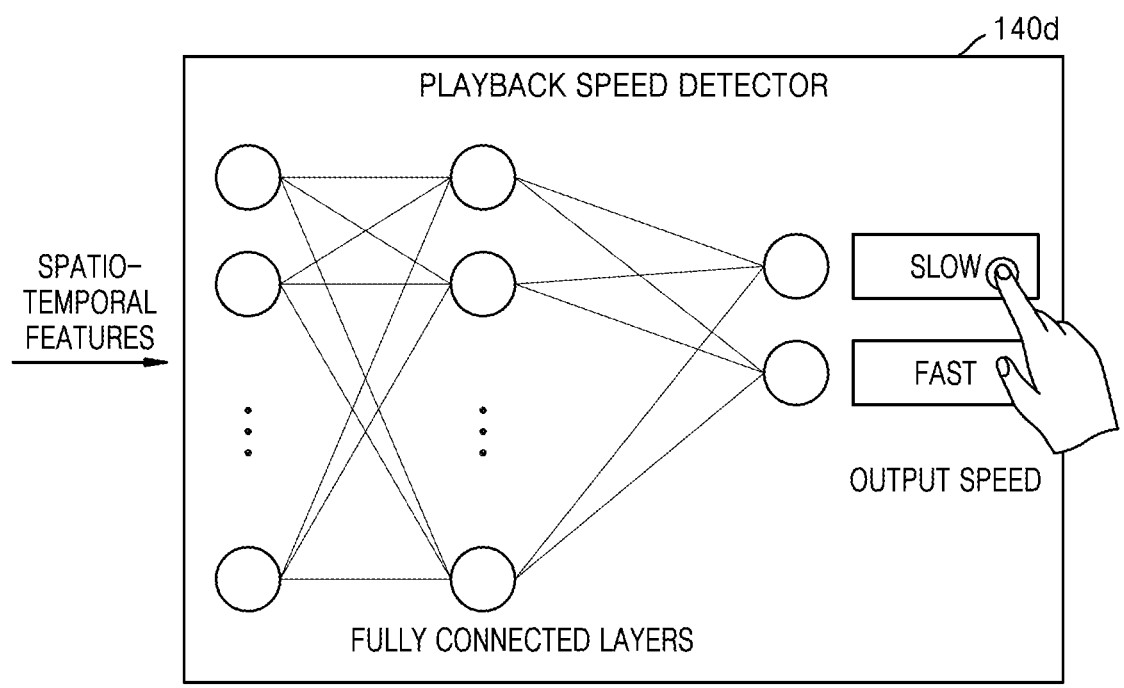
FIG. 7 is a diagram illustrating example operations of the playback speed detector according to various embodiments.

FIG. 7 is diagram illustrating an example in which the operations of the playback speed detector (140d) are explained, according to various embodiments. The playback speed detector (140d) receives spatio-temporal feature and applies the spatio-temporal features on a set of fully connected layers to predict the video playback speed. The fully connected layers are being trained along with TSM backbone and saliency detection block resulting in information sharing and joint learning for all the tasks.

Figure 8:
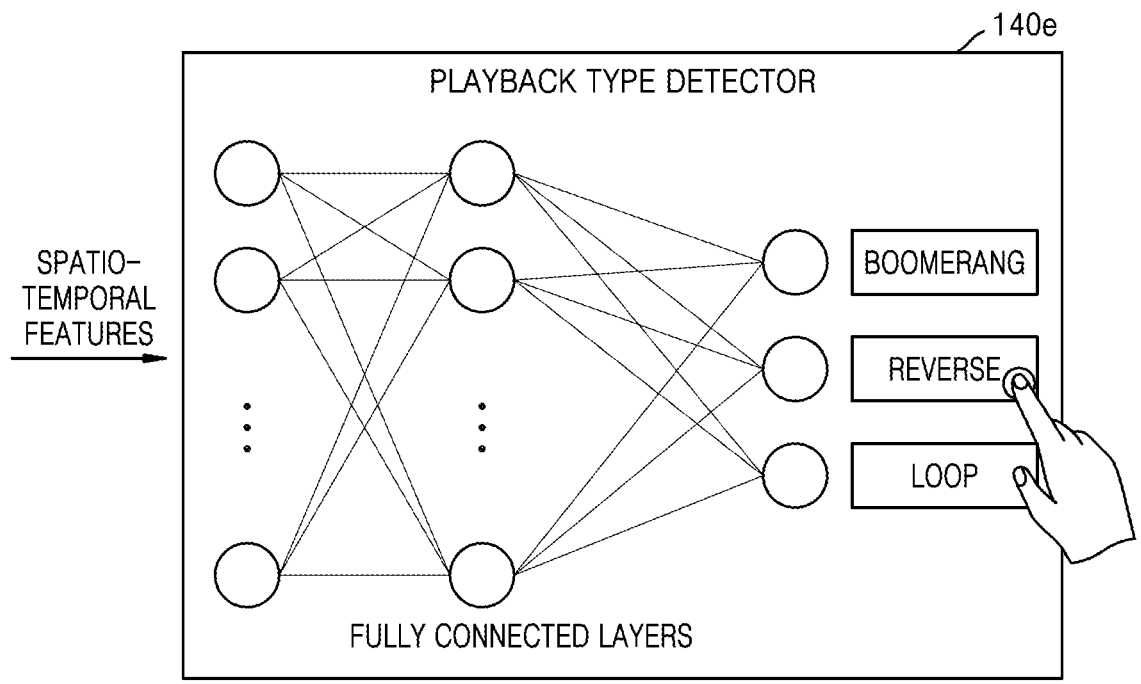
FIG. 8 is a diagram illustrating example operations of the playback type detector, according to various embodiments.

FIG. 8 is a diagram illustrating an example in which the operations of the playback type detector (140e) are explained, according to various embodiments. The playback type detector (140e) receives spatio-temporal feature and applies the spatio-temporal features on a set of fully connected layers to predict the video playback type. The fully connected layers are being trained along with TSM backbone and saliency detection block resulting in information sharing and joint learning for all the tasks.

Figure 9:
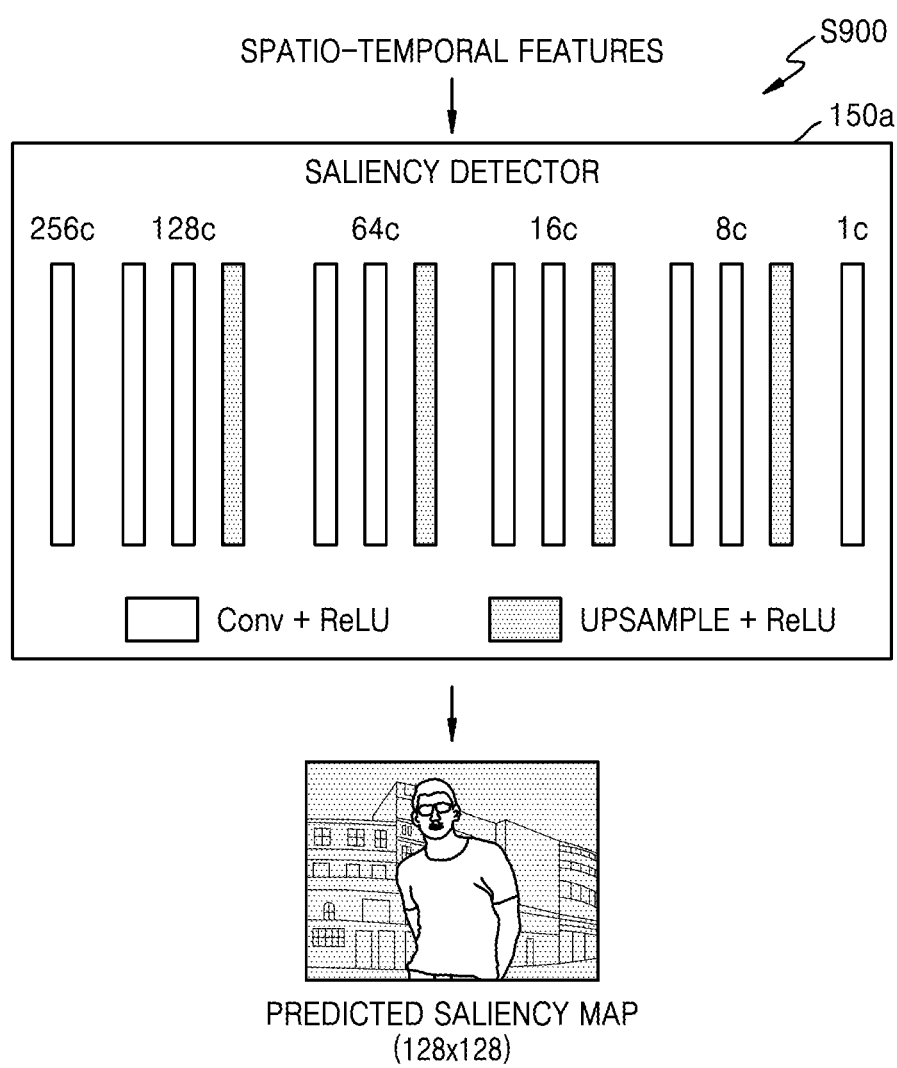
FIG. 9 is a diagram illustrating example e operations of the motion saliency detector, according to various embodiments.

FIG. 9 is a diagram (S900) illustrating an example in which the operations of the motion saliency detector (150a) are explained, according to various embodiments. The motion saliency detector (150a) includes combination of Cony+ReLU and an upsample+ReL. The learnt spatio-temporal features are then passed through the motion saliency detector (150a) that converts the feature map to a 2D video saliency map. The saliency detector block is trained along with TSM backbone and playback style detection block resulting in information sharing and joint learning for all the tasks.

Figure 10:
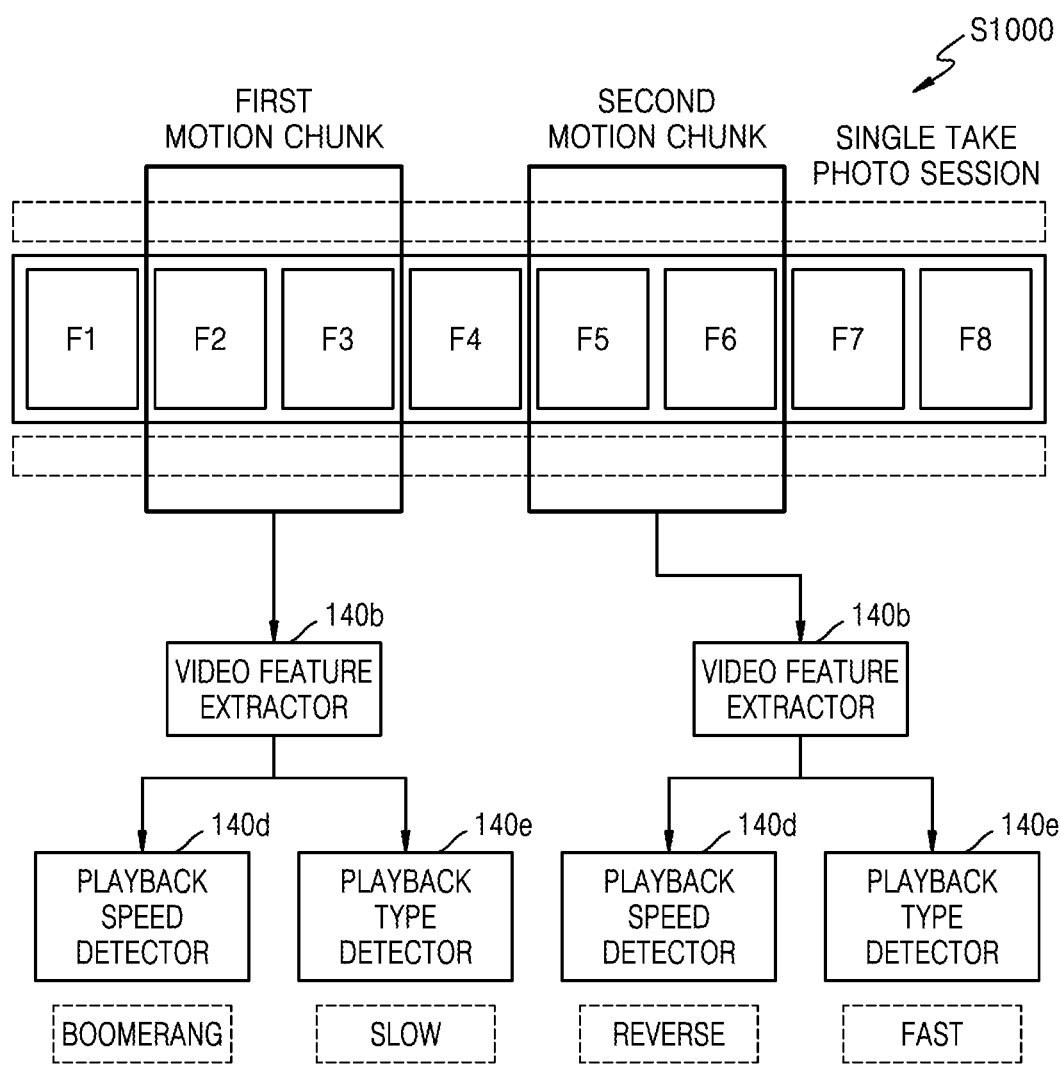
FIG. 10 is a diagram illustrating example Integration in single take photo pipeline, according to various embodiments.

FIG. 10 is a diagram illustrating an example in which Integration in single take photo pipeline is explained, according to various embodiments. Referring to the FIG. 10, F1, F2, F3 to F8 indicate a different frame of the video session in a single take photo session. The video feature extractor (140b) receives the first motion chunk and the second motion chunk in the single take photo session. The playback speed detector (140d) predicts the video playback speed on the first motion chunk and the second motion chunk in the single take photo session and the playback type detector (140e) predicts the video playback type on the first motion chunk and the second motion chunk in the single take photo session. The foregoing description of the various example embodiments will disclose the general nature of the embodiments herein that others can, by applying current knowledge, readily modify and/or adapt for various applications such specific embodiments without departing from the generic concept, and, therefore, such adaptations and modifications should and are intended to be comprehended within the scope and range of equivalents of the disclosed embodiments. It is to be understood that the phraseology or terminology employed herein is for the purpose of description and not of limitation. Therefore, while the embodiments herein have been described in terms of various example embodiments, those skilled in the art will recognize that the embodiments herein can be practiced with modification within the scope of the embodiments as described herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s).

What is claimed is:

1. A method comprising:
    detecting, by an electronic device, a first object and a second object in at least one image frame of a video;
    determining, by the electronic device, a type of motion of the first object and the second object in the video;
    determining, by the electronic device, a speed of the motion of the first object and the second object in the video;
    determining, by the electronic device, a first effect to be applied to the first object and a second effect to be applied to the second object based on the type of motion of the first object and the second object and the speed of the motion of the first object and the second object; and
    applying, by the electronic device, the first effect to the first object and the second effect to the second object.

2. The method of claim 1, wherein determining, by the electronic device, the first effect to be applied to the first object and the second effect to be applied to the second object comprises:
    classifying, by the electronic device, the motion of the first object and the second object into at least one category by applying at least one motion-based training model to the type of motion of the first object and the second object and the speed of the motion of the first object and the second object; and
    predicting, by the electronic device, the first effect to be applied to the first object and the second effect to be applied to the second object based on the at least one category of the motion of the first object and the second object.

3. The method of claim 2, comprising:
    training, by the electronic device, the at least one motion-based training model to predict the first effect and the second effect, wherein training the at least one motion-based training model comprises:
        determining a plurality of motion cues in the video, wherein the plurality of motion cues comprises temporal motion features, spatial motion features, and spatio-temporal knowledge of the video;
        determining a plurality of motion factors in the video, wherein the plurality of motion factors comprises a direction of the motion of each object in the video, a pattern of the motion of each object in the video, an energy level of the motion in the video, and a saliency map of the motion in the video; and
        training the at least one motion-based training model based on the plurality of motion cues and the plurality of motion factors to predict the first effect to be applied to the first object and the second effect to be applied to the second object.

4. The method of claim 1, wherein applying, by the electronic device, the first effect to the first object and the second effect to the second object comprises:
    determining, by the electronic device, a size of the first object and a first duration of the first object being in motion in the at least one image frame of the video;
    determining, by the electronic device, a size of the second object and a second duration of the second object being in motion in the at least one image frame of the video;
    determining, by the electronic device, a time period when both the first object and the second object are simultaneously in motion in the at least one image frame of the video based on the size of the first object, the first duration, the size of the second object, and the second duration; and
    applying, by the electronic device, the first effect to the first object and the second effect to the second object during the determined time period.

5. The method of claim 1, wherein determining, by the electronic device, the type of motion of the first object and the second object in the video comprises:
    determining, by the electronic device, the type of motion of the first object at a first time interval; and
    determining, by the electronic device, the type of motion of the second object at a second time interval, wherein the first time interval is different from the second time interval.

6. The method of claim 1, wherein determining, by the electronic device, the speed of the motion of the first object and the second object in the video comprises:
    determining, by the electronic device, the speed of the motion of the first object at a first time interval; and
    determining, by the electronic device, the speed of the motion of the second object at a second time interval, wherein the first time interval is different from the second time interval.

7. The method of claim 1, wherein the first effect comprises at least one of a first style effect or a first frame rate speed effect; and
    wherein the second effect comprises at least one of a second style effect or a second frame rate speed effect.

8. An electronic device comprising:
    a memory;
    at least one processor;
    a video motion controller, communicatively coupled to the memory and the at least one processor, configured to:

detect a first object and a second object in at least one image frame of a video, determine a type of motion of the first object and the second object in the video, and determine a speed of the motion of the first object and the second object in the video; and a video playback controller, communicatively coupled to the memory and the processor, configured to:

determine a first effect to be applied to the first object and a second effect to be applied to the second object based on the type of motion of the first object and the second object and the speed of the motion of the first object and the second object; and apply the first effect to the first object and the second effect to the second object.

9. The electronic device of claim 8, wherein determining the first effect to be applied to the first object and the second effect to be applied to the second object comprises:

classifying the motion of the first object and the second object into at least one category by applying at least one motion-based training model to the type of motion of the first object and the second object and the speed of the motion of the first object and the second object; and predicting the first effect to be applied to the first object and the second effect to be applied to the second object based on the at least one category of the motion of the first object and the second object.

10. The electronic device of claim 9, wherein the video playback controller is configured to train the at least one motion-based training model to predict the first effect and the second effect, wherein training the at least one motion-based training model comprises:

determining a plurality of motion cues in the video, wherein the plurality of motion cues comprises temporal motion features, spatial motion features, and spatio-temporal knowledge of the video;

determining a plurality of motion factors in the video, wherein the plurality of motion factors comprises a direction of the motion of each object in the video, a pattern of the motion of each object in the video, an energy level of the motion in the video, and a saliency map of the motion in the video; and training the at least one motion-based training model based on the plurality of motion cues and the plurality of motion factors to predict the first effect to be applied on the first object and the second effect to be applied to the second object.

11. The electronic device of claim 8, wherein applying the first effect to the first object and the second effect to the second object comprises:

determining a size of the first object and a first duration of the first object being in motion in the at least one image frame of the video;

determining a size of the second object and a second duration of the second object being in motion in the at least one image frame of the video;

determining a time period during which both the first object and the second object are simultaneously in motion in the at least one image frame of the video based on the size of the first object, the first duration, the size of the second object, and the second duration; and applying the first effect to the first object and the second effect to the second object during the determined time period.

12. The electronic device of claim 8, wherein determining the type of motion of the first object and the second object in the video comprises:

determining the type of motion of the first object at a first time interval; and determining the type of motion of the second object at a second time interval, wherein the first time interval is different from the second time interval.

13. The electronic device of claim 8, wherein determining the speed of the motion of the first object and the second object in the video comprises:

determining the speed of the motion of the first object at a first time interval; and determining the speed of the motion of the second object at a second time interval, wherein the first time interval is different from the second time interval.

14. The electronic device of claim 8, wherein the first effect comprises at least one of a first style effect or a first frame rate speed effect; and wherein the second effect comprises at least one of a second style effect or a second frame rate speed effect.

15. The electronic device of claim 10, wherein a pattern of the motion of each object in the video comprises spatially local motion indicating motion occurring within a first predetermined boundary in a scene of the video, spatially global motion indicating motion occurring beyond a second predetermined boundary in the scene of the video, and repeat of the motion indicating the same or substantially the same motion occurring within a predetermined time period in the video.

* * * * *